(12) United States Patent
Chen

(10) Patent No.: US 11,146,739 B2
(45) Date of Patent: Oct. 12, 2021

(54) METHOD FOR IMAGE SHOOTING, TERMINAL DEVICE, AND STORAGE MEDIUM

(71) Applicant: GUANGDONG OPPO MOBILE TELECOMMUNICATIONS CORP., LTD., Guangdong (CN)

(72) Inventor: Yan Chen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/871,541

(22) Filed: May 11, 2020

(65) Prior Publication Data

US 2020/0275035 A1 Aug. 27, 2020

Related U.S. Application Data

(63) Continuation of application No. PCT/CN2018/114422, filed on Nov. 7, 2018.

(30) Foreign Application Priority Data

Nov. 13, 2017 (CN) .......................... 201711116498.8

(51) Int. Cl.
*H04N 5/243* (2006.01)
*H04N 5/232* (2006.01)
(Continued)

(52) U.S. Cl.
CPC ......... *H04N 5/243* (2013.01); *H04N 5/23216* (2013.01); *H04N 5/23229* (2013.01)

(58) Field of Classification Search
CPC ....... G06T 2207/20212; G06T 2200/24; G06T 3/4038; G06T 3/4053; G06F 3/048;
(Continued)

(56) References Cited

U.S. PATENT DOCUMENTS 9,591,235 B2 * 3/2017 Li ........................ H04N 5/235
348/229.1
2003/0001962 A1 1/2003 Sakurai
(Continued)

FOREIGN PATENT DOCUMENTS

CN 101399925 A 4/2009
CN 102724400 A 10/2012
(Continued)

OTHER PUBLICATIONS

International search report,PCT/CN2018/114422, dated Jan. 31, 2019 (2 pages).
(Continued)

*Primary Examiner* — Marly S Camargo
(74) *Attorney, Agent, or Firm* — Young Basile Hanlon & MacFarlane, P.C.

(57) ABSTRACT

Embodiments of the present disclosure relate to the field of electronics and provide a method for image shooting, an apparatus, a terminal device, and a storage medium. The method includes: shooting, via an image shooting component, a preview image and acquiring an exposure parameter of the preview image, when a terminal device is in a state of being ready for image shooting; obtaining an image shooting parameter for a present night scene via an image shooting parameter estimation model based on the preview image and the exposure parameter; performing, in response to receiving an image shooting instruction, image shoot processing based on the estimated image shooting parameter to obtain a target synthesized image.

17 Claims, 12 Drawing Sheets

(51) Int. Cl.
*H04N 5/235* (2006.01)
*H04N 5/355* (2011.01)
*G06T 3/40* (2006.01)
*G06F 3/048* (2013.01)

(58) Field of Classification Search
CPC .............. H04N 5/243; H04N 5/23229; H04N 5/23216; H04N 5/23293; H04N 5/232933; H04N 5/23232; H04N 5/2352; H04N 5/2355; H04N 5/355; H04N 5/35536; H04N 1/00161; H04N 1/0044
USPC .. 348/222.1, 229.1, 227.1, 228.1, 221.1, 36, 348/362; 382/162, 167, 148, 299, 155; 715/700, 762, 273; 345/173, 619
See application file for complete search history.

(56) References Cited

U.S. PATENT DOCUMENTS

| | | | | |
|---|---|---|---|---|
| 2004/0207734 A1* | 10/2004 | Horiuchi | ................ | H04N 5/235 345/229.1 |
| 2009/0096896 A1* | 4/2009 | Imafuji | ................ | H04N 5/235 348/222.1 |
| 2010/0259636 A1 | 10/2010 | Tzur et al. | | |
| 2013/0002928 A1* | 6/2013 | Imai | ................... | H04N 5/23223 348/342 |
| 2016/0093243 A1* | 3/2016 | Su | ............................ | G09G 3/20 345/690 |
| 2021/0168304 A1* | 6/2021 | Song | .................... | H04N 5/2628 |

FOREIGN PATENT DOCUMENTS

| | | | | |
|---|---|---|---|---|
| CN | 105657242 A | | 6/2016 | |
| CN | 105763814 A | | 7/2016 | |
| CN | 107205120 A | * | 9/2017 | .............. G06T 3/40 |
| CN | 107205120 A | | 9/2017 | |
| CN | 107809591 A | | 3/2018 | |
| EP | 2043361 A1 | | 4/2009 | |
| WO | 2013109261 A1 | | 7/2013 | |

OTHER PUBLICATIONS

First Office Action from China patent office in a counterpart Chinese patent Application 201711116498.8, dated Sep. 4, 2019 (9 pages).
European Search Report for EP18876905.3 dated Dec. 18, 2020 (7 pages).
Indian Examination Report for IN Application 202017018207 dated May 23, 2021. (6 pages).

* cited by examiner

METHOD FOR IMAGE SHOOTING, TERMINAL DEVICE, AND STORAGE MEDIUM

CROSS-REFERENCE TO RELATED APPLICATION(S)

The present application is a continuation-application of International (PCT) Patent Application No. PCT/CN2018/114422, filed on Nov. 7, 2018, which claims priority to Chinese Patent Application No. 201711116498.8, filed on Nov. 13, 2017, the entire contents of both of which are hereby incorporated by reference in their entireties.

TECHNICAL FIELD

The present disclosure relates to the field of electronics, and in particular to a method for image shooting a terminal device, and a non-transitory computer-readable storage medium.

BACKGROUND

As electronic technologies develop, terminal devices, such as mobile phones, computers, and the like, have been widely used. Varieties of applications installed in the terminal devices are increasing, and the applications may have an increased number of functions. An application for image shooting may be a commonly installed application, and a user may activate the application to shoot an image.

SUMMARY

Embodiments of the present disclosure provide a method for image shooting, a terminal device, and a non-transitory computer-readable storage medium.

According to a first aspect of the present disclosure, a method for image shooting may be provided and include: shooting preview images via an image shooting component and acquiring values of an exposure parameter corresponding to the preview images, when the terminal device is in a pending state for image shooting; estimating a value of an image-shooting parameter of a present night scene via an estimation model according to the preview images and the values of the exposure-parameter corresponding to the preview images, wherein the estimation model is trained by taking an image data parameter, the exposure parameter, and the image shooting parameter as variables; and the image shooting parameter comprises an image-synthesizing number, which is a number of preview images required to obtain a target synthesized-image; and performing an image-shooting process according to the estimated value of the image-shooting parameter, in response to an image-shooting instruction, to obtain the target synthesized-image.

According to a second aspect of the present disclosure, a terminal device may be provided and include a processor and a non-transitory memory. The non-transitory memory is arranged to store at least one instruction, at least one program, a code set, or an instruction set. The at least one instruction, the at least one program, the code set, or the instruction set are loaded and executed by the processor to perform operations of: shooting, via an image shooting component, preview images and acquiring values of an exposure parameter corresponding to the preview images, when the terminal device is in a pending state for image shooting; estimating, via an estimation model, a value of an image-shooting parameter of a present night scene according to the preview images and the values of the exposure parameter corresponding to the preview images, wherein the estimation model is trained by taking an image data parameter, the exposure parameter, and the image shooting parameter as variables; and the image shooting parameter comprises an image-synthesizing number, which is a number of preview images required to obtain a target synthesized-image; and performing an image-shooting process according to the estimated value of the image-shooting parameter, in response to an image-shooting instruction, to obtain the target synthesized-image.

According to a third aspect of the present disclosure, a non-transitory computer-readable storage medium is provided and include at least one instruction, at least one program, a code set, or an instruction set stored in. The at least one instruction, the at least one program, the code set, or the instruction set are capable of being loaded and executed by a processor to perform operations of: shooting preview images and acquiring values of an exposure parameter corresponding to the preview images; estimating a value of an image shooting parameter of a present night scene via an estimation model based on the preview images and the values of the exposure parameter corresponding to the preview images, wherein the estimation model is trained by taking an image data parameter, the exposure parameter, and the image shooting parameter as variables, the image shooting parameter comprises an image-synthesizing number, which is a number of preview images required to obtain a target synthesized-image; and performing an image-shooting process according to the estimated value of the image-shooting parameter, in response to an image-shooting instruction, to obtain the target synthesized-image.

BRIEF DESCRIPTION OF DRAWINGS

In order to illustrate technical solutions of embodiments of the present disclosure in details, drawings required for illustrating the embodiments will be described in brief. Obviously, the following drawings illustrate only some embodiments of the present disclosure, and to any one of skill in the related art, other drawings may be obtained based on the following drawings without any creative work.

DETAILED DESCRIPTION

Figure 1:
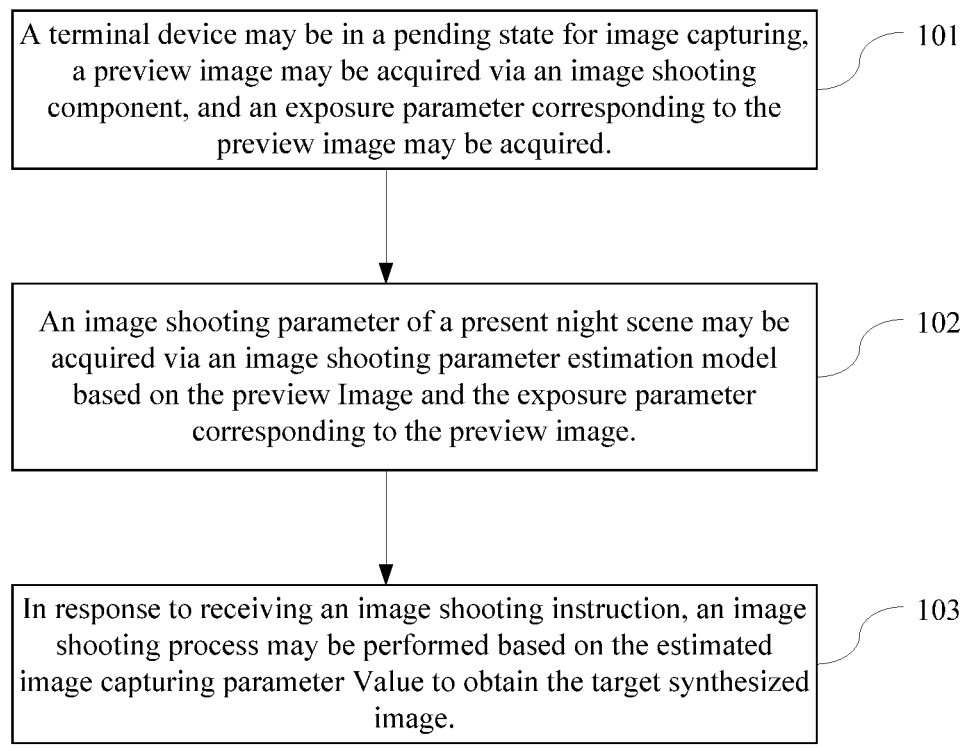
FIG. 1 is a flow chart of a method for image shooting according to an embodiment of the present disclosure.

According to a first aspect of the present disclosure, a method for image shooting may be provided and include: shooting preview images via an image shooting component and acquiring values of an exposure parameter corresponding to the preview images, when the terminal device is in a pending state for image shooting; estimating a value of an image-shooting parameter of a present night scene via an estimation model according to the preview images and the values of the exposure-parameter corresponding to the preview images, wherein the estimation model is trained by taking an image data parameter, the exposure parameter, and the image shooting parameter as variables; and the image shooting parameter comprises an image-synthesizing number, which is a number of preview images required to obtain a target synthesized-image; and performing an image-shooting process according to the estimated value of the image-shooting parameter, in response to an image-shooting instruction, to obtain the target synthesized-image.

In some embodiments, the image-shooting parameter further includes a performance parameter of the terminal device.

In some embodiments, before the estimating a value of an image-shooting parameter of a present night scene via an estimation model according to the preview images and the values of the exposure-parameter corresponding to the preview images, the method further includes: training the estimation model based on a pre-stored correspondence relationship among training preview images, values of a training exposure parameter, and values of a training image-shooting parameter in a training set, and by following a pre-stored training principle of values of the image-shooting parameter estimated by the estimation model, being approached towards values of the training image-shooting parameter corresponding to the training preview images and the values of the training exposure parameter, to achieve the estimation model.

In some embodiments, the method further includes: shooting a predefined number of preview images via the image shooting component; determining a target preview image among the predefined number of preview images and acquiring a target value of the exposure parameter corresponding to the target preview image; selecting a predefined synthesis number of preview images comprising the target preview image from the predefined number of preview images to obtain a set of target preview images corresponding to the predefined synthesis number, wherein a plurality of predefined synthesis numbers are pre-stored in the terminal device, and a plurality of sets of target preview images corresponding to the plurality of predefined synthesis numbers are obtained according to each of the plurality of predefined synthesis numbers; performing an image-synthesis process for each of the plurality of sets of target preview images to obtain a synthesized image corresponding to the predefined synthesis number, such that a plurality of synthesized images corresponding to the plurality of predefined synthesis numbers are obtained; determining a synthesized image having optimal image quality from the plurality of synthesized images corresponding to the plurality of predefined synthesis numbers to be the target synthesized-image, and determining a target predefined synthesis number corresponding to the target synthesized-image to be a target value of the image-shooting parameter; and storing the target preview image, the target value of the exposure parameter, and the target value of the image-shooting parameter into the training set correspondingly.

In some embodiments, the performing an image-synthesis process for each of the plurality of sets of target preview images to obtain a synthesized image corresponding to the predefined synthesis number includes: performing the image-synthesis process to the set of target preview images based on each of a plurality of values of a performance parameter of the terminal device to obtain a plurality of synthesized images corresponding to the predefined synthesis number and each of the plurality of values of the performance parameter of the terminal device. The determining a synthesized image having optimal image quality from the plurality of synthesized images corresponding to the plurality of predefined synthesis numbers to be the target synthesized-image, and determining a target predefined synthesis number corresponding to the target synthesized-image to be a target value of the image-shooting parameter includes: determining the target synthesized image having the optimal image quality from the obtained plurality of synthesized images, wherein each of the plurality of synthesized images corresponds to each of the plurality of predefined synthesis numbers and each of the plurality of values of the performance parameter, and determining the target predefined synthesis number and a target predefined value of the performance parameter of the terminal device corresponding to the target synthesized image to be the target value of the image-shooting parameter.

In some embodiments, recording power consumption for obtaining the synthesized image corresponding to the predefined synthesis number. The determining a synthesized image having optimal image quality from the plurality of synthesized images corresponding to the plurality of predefined synthesis numbers to be the target synthesized-image, and determining a target predefined synthesis number corresponding to the target synthesized-image to be a target value of the image-shooting parameter includes: determining a synthesized image having comprehensively optimal image quality and power consumption among the plurality of synthesized images corresponding to the plurality of predefined synthesis numbers to be the target synthesized-image, and determining the target predefined synthesis number to be the target value of the image-shooting parameter.

In some embodiments, the performing an image-shooting process according to the estimated value of the image-shooting parameter, in response to an image-shooting instruction, to obtain the target synthesized-image includes: acquiring a set of target preview images based on the target predefined synthesis number; and performing the image-synthesis process to the set of target preview images to obtain the target synthesized-image.

In some embodiments, the value of the image-shooting parameter comprises a target value of the performance parameter of the terminal device, and the performing the image-synthesis process to the set of target preview images to obtain the target synthesized-image includes: performing the image-synthesis process to the set of target preview images based on the target value of the performance parameter of the terminal device to obtain the target synthesized-image.

In some embodiments, before the shooting preview images via an image shooting component and acquiring values of an exposure parameter corresponding to the preview images, the method further includes: detecting whether a present time stamp is within a predefined time range; and performing, in response to the present time stamp being within the predefined time range, the shooting preview images via an image shooting component and acquiring values of an exposure parameter corresponding to the preview images.

According to a second aspect of the present disclosure, a terminal device may be provided and include a processor and a non-transitory memory. The non-transitory memory is arranged to store at least one instruction, at least one program, a code set, or an instruction set. The at least one instruction, the at least one program, the code set, or the instruction set are loaded and executed by the processor to perform operations of: shooting, via an image shooting component, preview images and acquiring values of an exposure parameter corresponding to the preview images, when the terminal device is in a pending state for image shooting; estimating, via an estimation model, a value of an image-shooting parameter of a present night scene according to the preview images and the values of the exposure parameter corresponding to the preview images, wherein the estimation model is trained by taking an image data parameter, the exposure parameter, and the image shooting parameter as variables; and the image shooting parameter comprises an image-synthesizing number, which is a number of preview images required to obtain a target synthesized-image; and performing an image-shooting process according to the estimated value of the image-shooting parameter, in response to an image-shooting instruction, to obtain the target synthesized-image.

In some embodiments, the image shooting parameter further includes a performance parameter of the terminal device.

In some embodiments, the at least one instruction, the at least one program, the code set, or the instruction set are further loaded and executed by the processor to perform operations of: training the estimation model based on a pre-stored correspondence relationship among training preview images, values of a training exposure parameter, and values of a training image-shooting parameter in a training set, and by following a pre-stored training principle of values of the image-shooting parameter estimated by the estimation model, being approached towards values of the training image-shooting parameter corresponding to the training preview images and the values of the training exposure parameter, to achieve the estimation model.

In some embodiments, the at least one instruction, the at least one program, the code set, or the instruction set are further loaded and executed by the processor to perform operations of: shooting, via the image shooting component, a predefined number of preview images; determining a target preview image from the predefined number of preview images and acquire a target value of the exposure parameter corresponding to the target preview image; selecting a predefined synthesis number of preview images comprising the target preview image from the predefined number of preview images to obtain a set of target preview images corresponding to the predefined synthesis number; and performing an image synthesis process to the set of target preview images to obtain a synthesized image corresponding to the predefined synthesis number, wherein a plurality of predefined synthesis numbers are stored in the terminal device, a plurality of sets of target preview images corresponding to the plurality of predefined synthesis numbers are obtained, and a plurality of synthesized images corresponding to the plurality of predefined synthesis numbers are obtained; determining a synthesized image having optimal image quality from the plurality of synthesized images corresponding to the plurality of predefined synthesis numbers to be the target synthesized-image, and determining a target predefined synthesis number corresponding to the target synthesized image to be a target value of the image shooting parameter; and storing the target preview image, the target value of the exposure parameter, the target value of the image shooting parameter into the training set correspondingly.

In some embodiments, the at least one instruction, the at least one program, the code set, or the instruction set are further loaded and executed by the processor to perform operations of: performing the image-synthesis process to the set of target preview images, based on each of a plurality of predefined values of a performance parameter of the terminal device, to obtain a synthesized image corresponding to the predefined synthesis number and each of the plurality of predefined values of the performance parameter of the terminal device, wherein a plurality of synthesized images are obtained corresponding to the plurality of predefined synthesis numbers and the plurality of predefined values of the performance parameter of the terminal device; and determining the target synthesized image having the optimal image quality from the obtained plurality of synthesized images corresponding to the plurality of predefined synthesis numbers and the plurality of predefined values of the performance parameter of the terminal device, and determining the target predefined synthesis number and a target predefined value of the performance parameter of the terminal device corresponding to the target synthesized image to be target values of the image shooting parameter.

In some embodiments, the at least one instruction, the at least one program, the code set, or the instruction set are further loaded and executed by the processor to perform operations of: recording power consumption for obtaining each of the plurality of synthesized images corresponding to each of the plurality of predefined synthesis numbers; and determining a synthesized image having comprehensively optimal image quality and the power consumption from the plurality of synthesized images corresponding to the plurality of predefined synthesis numbers to be the target synthesized image, and determining the target predefined synthesis number corresponding to the target synthesized image to be the target value of the image shooting parameter.

In some embodiments, the value of the image shooting parameter comprises the target predefined synthesis number, and the at least one instruction, the at least one program, the code set, or the instruction set are further loaded and executed by the processor to perform operations of: obtaining the set of preview images based on the target predefined synthesis number, and performing the image-synthesis process to the set of target preview images to obtain the target synthesized image.

In some embodiments, the value of the image shooting parameter comprises a target value of the performance parameter of the terminal device, and the at least one instruction, the at least one program, the code set, or the instruction set are further loaded and executed by the processor to perform operations of: performing the image-synthesis process to the set of target preview images, based on the target value of the predefined performance parameter of the terminal device, to obtain the target synthesized image.

In some embodiments, the at least one instruction, the at least one program, the code set, or the instruction set are further loaded and executed by the processor to perform operations of: detecting whether a present time stamp is within a predefined time range; and shooting, via the image shooting component, the preview images and acquiring the values of the exposure parameter corresponding to the preview images, in response to the present time stamp being within the predefined time range.

According to a third aspect of the present disclosure, a non-transitory computer-readable storage medium is provided and include at least one instruction, at least one program, a code set, or an instruction set stored in. The at least one instruction, the at least one program, the code set, or the instruction set are capable of being loaded and executed by a processor to perform operations of: shooting preview images and acquiring values of an exposure parameter corresponding to the preview images; estimating a value of an image shooting parameter of a present night scene via an estimation model based on the preview images and the values of the exposure parameter corresponding to the preview images, wherein the estimation model is trained by taking an image data parameter, the exposure parameter, and the image shooting parameter as variables, the image shooting parameter comprises an image-synthesizing number, which is a number of preview images required to obtain a target synthesized-image; and performing an image-shooting process according to the estimated value of the image-shooting parameter, in response to an image-shooting instruction, to obtain the target synthesized-image.

In some embodiments, the at least one instruction, the at least one program, the code set, or the instruction set are further capable of being loaded and executed by a processor to perform operations of: training the estimation model based on a pre-stored correspondence relationship among training preview images, values of a training exposure parameter, and values of a training image-shooting parameter in a training set, and by following a pre-stored training principle of values of the image-shooting parameter estimated by the estimation model, being approached towards values of the training image-shooting parameter corresponding to the training preview images and the values of the training exposure parameter, to achieve the estimation model.

Implementations of the present disclosure may further be described in details by referring to the drawings in order to illustrate technical solutions and objectives of the present disclosure clearly.

Embodiments of the present disclosure may provide a method for image shooting, and the method may be performed by a terminal device. The terminal device may be a terminal device having a function of image shooting, such as a terminal device installed with an application of image shooting. The terminal device may include components such as a processor, a non-transitory memory, an image shooting component, a display screen, and the like. The processor may be a central processing unit (CPU) or the like, and may be arranged to determine an image shooting parameter value and perform a process related to image shooting. The non-transitory memory may be a random access memory (RAM), a flash memory, and the like, and may be arranged to store received data, data required during performing the process, data generated during performing the process, and the like, such as an estimation model that is able to estimate an image shooting parameter value. The image shooting component may be a camera, and may be arranged to acquire a preview image. The display screen may be a touch screen, and may be arranged to display the preview image acquired by the image shooting component and to detect a touch signal.

In the related art, when a user activates the application of image shooting, the application of image shooting may provide a function of night scene synthesis to allow the user to shoot an image in a night scene. Specifically, when the user intends to shoot an image in a night scene, the user may find a click to activate or deactivate the function of night scene synthesis. By pressing the click, the function of night scene synthesis may be activated, and when the user press a click for image shooting, the terminal device may perform image shooting and processing based on a predefined number of images for image synthesis. Specifically, the terminal device may acquire the predefined number of images for image synthesis consecutively via the image shooting component (such as the camera). The acquired predefined number of images may be referred as preview images, and the acquired predefined number of images for image synthesis may be processed to obtain a synthesized image, and that is, an image synthesized from a plurality of preview images may be obtained, and the synthesized image may be stored in a gallery of the terminal device. In such a way, whenever the user intends to shoot an image in a night scene, the click to activate the function of night scene synthesis needs to be found and clicked manually, reducing an efficiency of image shooting.

As shown in FIG. 1, a flow chart of a method for image shooting according to an embodiment of the present disclosure is provided. The method may include following operations.

At an operation of 101, a terminal device may be in a pending state for image shooting, a preview image may be acquired via an image shooting component, and an exposure parameter value corresponding to the preview image may be acquired.

The pending state for image shooting may refer to the terminal device displaying an interface for image shooting. The image shooting component may be a camera of the terminal device. The preview image may be an image displayed in the terminal device acquired by the image shooting component, and that is an image prior to image synthesis. That is, the preview image may be an image acquired by the image shooting component before the user pressing a click for image capturing. The exposure parameter value corresponding to the preview image may be an exposure parameter value determined during shooting the preview image, and may include exposure duration, white balance, and the like. The exposure parameter value may be arranged to identify a night scene, that is, various exposure parameter values may identify various night scenes.

Alternatively, the terminal device may be installed with an application of image shooting. When the user intends to shoot an image, an icon of the application may be clicked, and the terminal device may receive an activation instruction correspondingly, such that the application of image shooting may be activated, and at this moment, the terminal device may be in the pending state for image shooting.

When the terminal device is in the pending state for image shooting, the terminal device may shoot the preview image via the image shooting component. Further, after the application of image shooting is activated, the terminal device may determine the exposure parameter value (the exposure parameter value may include the exposure duration, the white balance, and the like) at real time based on brightness of an environment and a color of a light source in the environment, such that the terminal device may perform image shooting and processing based on the exposure parameter value.

In addition, a predefined period for image shooting may be set in the terminal device. When the terminal device is in the pending state for image shooting, the terminal device may shoot the preview image via the image shooting component and acquire the exposure parameter value corresponding to the preview image in response to the predefined period for image shooting being met. Further, a predefined time range may be stored in the terminal device. The predefined time range may be a time range corresponding to night scenes, such as from 5 pm to 12 am, and from 12 am to 6 am. In response to a present time point being within the predefined time range, when the terminal device is in the pending state for image shooting, the preview image may be acquired via the image shooting component, and the exposure parameter value corresponding to the preview image may be acquired.

At an operation of 102, an image shooting parameter value of a present night scene may be acquired via an estimation model based on the preview image and the exposure parameter value corresponding to the preview image.

The estimation model may be obtained by training, and during the training, an image data parameter, the exposure parameter, and the image shooting parameter may be taken as variables. In the present embodiment, the terminal device may set the preview image as a value of the image data parameter, and the exposure parameter value corresponding to the preview image may be determined as a value of the exposure parameter for training. The image shooting parameter may include the number of images for image synthesis, and the number of images for image synthesis may be referred as an image-synthesizing number. The image-synthesizing number may refer to the number of preview images required to obtain a target synthesized image. Alternatively, the image shooting parameter may further include a performance parameter of the terminal device. The performance parameter of the terminal device may be a parameter able to affect a capability of the terminal device, such as an operating frequency of a central processing unit (also termed as a CPU dominant frequency).

The image shooting parameter value may refer to a value of the image shooting parameter required to obtain the target synthesized image. When the image shooting parameter includes the image-synthesizing number, the image shooting parameter value may include a value of the image-synthesizing number, and will be referred as a target predefined synthesis number hereafter. When the image shooting parameter includes the performance parameter of the terminal device, the image shooting parameter value may include a value of the performance parameter of the terminal device, and will be referred as a target predefined performance parameter value of the terminal device. During implementation, the terminal device may store the estimation model in advance, and the estimation model is trained in advance. The estimation model may be arranged to estimate the image shooting parameter value of the present night scene based on the preview image acquired at present and the exposure parameter value corresponding to the preview image. After a plurality of preview images and a plurality of exposure parameter values corresponding to the plurality of preview images are acquired, each of the plurality of preview images and each of the plurality of exposure parameter values may be input into the estimation model trained in advance, and an output of the estimation model may be obtained, and the image shooting parameter value of the present night scene may be obtained. To be specific, after the preview image and the exposure parameter value corresponding to the preview image are acquired, the terminal device may take the preview image as the value of the image data parameter for training, and take the exposure parameter value corresponding to the preview image as the value of the exposure parameter for training. The values may be input into the estimation model to obtain the image shooting parameter value for the present night scene.

At an operation of 103, in response to receiving an image shooting instruction, an image-shooting process may be performed based on the estimated image shooting parameter value to obtain the target synthesized image.

The image shooting instruction may be triggered by the user. When the user intends to shoot the image, the user may click an image shooting control, and the terminal device may receive the image shooting instruction.

When the image shooting parameter includes the image-synthesizing number, the image shooting parameter value may include the target predefined synthesis number (i.e., the target predefined number of images for image synthesis). The operation of 103 may be achieved by: acquiring a set of target preview images based on the target predefined synthesis number; performing the image-synthesis process to the set of target preview images to obtain the target synthesized image. Specifically, the terminal device may consecutively shoot an estimated number of preview images for image synthesis, and perform image synthesis to the acquired target predefined number of images for image synthesis to obtain the target synthesized image. The target synthesized image may be stored in a gallery of the terminal device.

When the image shooting parameter includes the image-synthesizing number and the performance parameter of the terminal device, the image shooting parameter value may include the target predefined synthesis number and the target predefined performance parameter value of the terminal device. The operation of 103 may be achieved by: acquiring a set of target preview images based on the target predefined synthesis number; performing the image-synthesis process to the set of target preview images based on the target predefined performance parameter value of the terminal device to obtain the target synthesized image. When the image shooting parameter includes the image-synthesizing number and the performance parameter of the terminal device, the terminal device may consecutively shoot an estimated number of preview images for image synthesis, and may set the performance parameter of the terminal device as an estimated performance parameter of the terminal device. Further, based on the estimated performance parameter of the terminal device, image synthesis may be performed to the number of preview images for image synthesis acquired by the terminal device (image synthesis may be achieved by performing an algorithm to synthesize an image of a night scene, and the algorithm may be available in the related art) to obtain the target synthesized image. The target synthesized image may be stored in the gallery of the terminal device.

Further, referring to the operation of 101, in response to the predefined period being met, under the situation of shooting the preview image via the image shooting component and acquiring the exposure parameter corresponding to the preview image, the operation of 102 may be performed once after each preview image is acquired in order to determine the image shooting parameter value of the present night scene (i.e., corresponding to a present acquisition period). In the present shooting period, the terminal device may perform image shooting and processing based on the estimated image shooting parameter value corresponding to the present shooting period in response to each image shooting instruction.

According to the present disclosure, when the terminal device is in the pending state for image shooting, the terminal device may shoot the preview image via the image shooting component and acquire the exposure parameter corresponding to the preview image. The image shooting parameter value of the present night scene may be estimated by the estimation model based on the preview image. The estimation model may be trained in advance by taking the image data parameter, the exposure parameter, and the image shooting parameter as variables. The image shooting parameter may include the number of images for synthesis. In response to receiving the image shooting instruction, the terminal device may perform image shooting and processing based on the estimated image shooting parameter value. In such a way, when the user intends to shoot an image at a night scene, the terminal device may automatically calculate the number of images for image synthesis (i.e., the image-synthesizing number) for the present night scene, and may perform image shooting and processing based on the number of images for synthesis. The user may not need to manually activate the function of night scene synthesis, improving the efficiency of image shooting.

Prior to the estimation model acquiring the image shooting parameter value of the present night scene, the estimation model is required to be trained. On the basis of an available embodiment according to the embodiment shown in FIG. 1, prior to the operation of 102, the method for image shooting may further include following operations.

The estimation model may be trained by following a training principle and based on a correspondence relationship. The correspondence relationship may be correspondence among the preview image, the exposure parameter value, and the image shooting parameter value, wherein the preview image, the exposure parameter value, and the image shooting parameter value are stored in the training set in advance. The training principle may be approaching the image shooting parameter value estimated by the estimation model towards the image shooting parameter value corresponding to the preview image and the exposure parameter, wherein the image shooting parameter value corresponding to the preview image and the exposure parameter value may be stored in the terminal device in advance. A trained estimation model may be obtained and may take the image data parameter, the exposure parameter, and the image shooting parameter as variables.

During implementation, the terminal device may store the training set, and the training set may include a correspondence relationship among each preview image, each exposure parameter value, and each image shooting parameter value. As a plurality of preview images may be acquired, a plurality of exposure parameter values and a plurality of image shooting parameter values may be acquired, and a plurality of correspondence relationships may be generated and included in the training set. For each of the plurality of correspondence relationships, the image shooting parameter value may be a value of the image shooting parameter allowing the synthesized image to have optimal image quality under a situation of the preview image and the exposure parameter being expressed. The terminal device may train the estimation model based on the stored training set, wherein the image shooting parameter estimation model may include a parameter value to be determined. That is, the terminal device may train the estimation model by following the training principle, wherein the training principle may be approaching the image shooting parameter value estimated by the estimation model towards the image shooting parameter value stored in the terminal device in advance, and the image shooting parameter value may correspond to the preview image and the exposure parameter value. Specifically, the terminal device may input the preview image and the exposure parameter value of each correspondence relationship into the estimation model including the parameter value to be determined to obtain an image shooting parameter with a value to be determined. Further, a target function may be obtained by following the training principle, wherein the training principle may be approaching the image shooting parameter value with the value to be determined towards the image shooting parameter value of the correspondence relationship. For example, the target function may be a function of subtracting the image shooting parameter value of the correspondence relationship from the obtained image shooting parameter value. After the target function is obtained, a training value of the parameter may be obtained by performing a gradient descent method, and the training value may be taken as a value corresponding to the parameter having a value to be determined when training based on a next correspondence relationship. Similarly, after the training is completed, the training value of the parameter having a value to be determined may be determined. Further, the above-mentioned estimation model may be a convolutional neural network model, and under such a situation, the parameter value to be determined may be each convolutional kernel of the convolutional neural network model.

Alternatively, each of the plurality of correspondence relationships may be selected based on quality of the synthesized image. Specifically, a predefined number of preview images may be acquired by the image shooting component. A target preview image may be determined among the acquired preview images, and a target exposure parameter corresponding to the target preview image may be acquired. A plurality of predefined synthesis numbers may be stored in the terminal device. Preview images including the target preview image and corresponding to each predefined synthesis number may be selected from the predefined number of preview images, and a set of target preview images corresponding to each predefined synthesis number may be obtained. Therefore, a plurality of sets of target preview images corresponding to the plurality of predefined synthesis numbers are obtained. Image synthesis may be performed to each set of target preview images, and a synthesized image corresponding to each predefined synthesis number may be obtained. Therefore, a plurality of synthesized images corresponding to the plurality of predefined synthesis numbers may be obtained. A target synthesized image having optimal image quality may be determined among the plurality of synthesized images corresponding to the plurality of predefined synthesis numbers, and a target predefined synthesis number corresponding to the target synthesized image may be determined as the target image shooting parameter value. The target preview image, the target exposure parameter value, and the target image shooting parameter value may be stored into the training set correspondingly.

During implementation, each of the plurality of correspondence relationships may be determined based on the predefined number of preview images acquired by the terminal device. Various night scenes (such as at various time points) may correspond to various predefined numbers of preview images, the terminal device may shoot the various predefined numbers of preview images, and various correspondence relationships may be determined based on the various predefined numbers of preview images acquired. For example, a first correspondence relationship may be determined based on the predefined number of preview images acquired at 19:00 by the terminal device, and a second correspondence relationship may be determined based on the predefined number of preview images acquired at 19:20 by the terminal device. A process of determining a certain correspondence relationship will be illustrated in details hereafter, and other correspondence relationships may be determined in a same manner.

Figure 2:
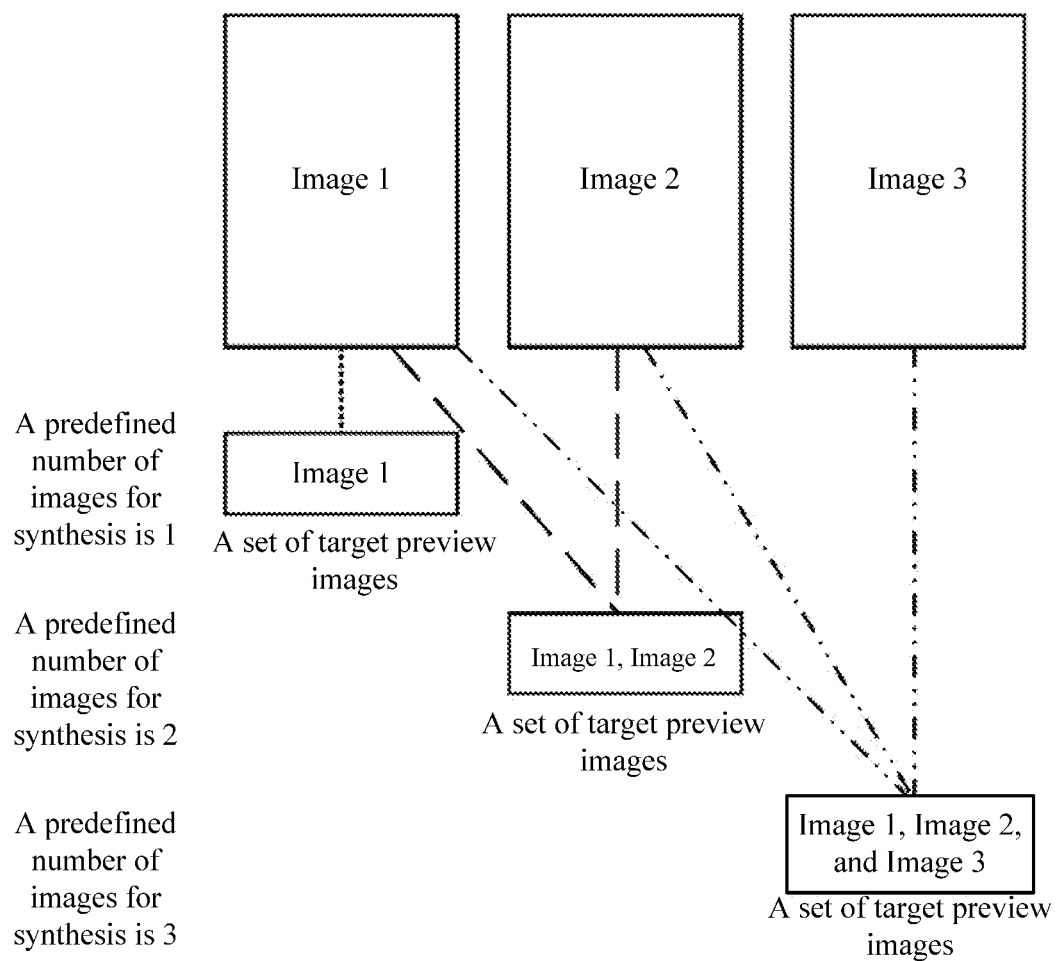
FIG. 2 is a diagram of various predefined numbers of images for synthesis corresponding to a set of target preview images according to an embodiment of the present disclosure.

Specifically, in a night scene, the terminal device may consecutively shoot the predefined number of preview images via the image shooting component. The preview images may be acquired directly by the image shooting component and may not be processed for image synthesis or any other purpose. Further, one preview image may be selected from the acquired predefined number of preview images to be the target preview image, and the exposure parameter value corresponding to the target preview image (referred as the target exposure parameter value) may be acquired. After the target preview image is selected, the predefined synthesis number of preview images including the target preview image may be selected from the acquired predefined number of preview images, and a set of target preview images corresponding to the predefined synthesis number may be obtained. The terminal device may store a plurality of predefined synthesis numbers. Therefore, a plurality of sets of target preview images corresponding to the plurality of predefined synthesis numbers may be obtained. For example, as shown in FIG. 2, the terminal device may shoot 3 preview images, a preview image 1, a preview image 2, and a preview image 3. The first preview image, i.e., the preview image 1, may be selected to be the target preview image. The plurality of predefined synthesis numbers may be 1, 2, and 3, i.e., 3 predefined synthesis numbers are stored in the terminal device. When the predefined synthesis number is 1, the terminal device may select the preview image 1 to obtain a set of target preview images corresponding to the predefined synthesis number being 1. When the predefined synthesis number is 2, the terminal device may select the preview image 1 and the preview image 2 to obtain a set of target preview images corresponding to the predefined synthesis number being 2. When the predefined synthesis number is 3, the terminal device may select the preview image 1, the preview image 2, and the preview image 3 to obtain a set of target preview images corresponding to the predefined synthesis number being 3. Therefore, 3 sets of target preview images corresponding to 3 predefined synthesis numbers are obtained.

After the set of target preview images of each predefined synthesis number is obtained, image synthesis may be performed to the set of target preview images, and that is, image synthesis may be performed to the target preview images in the set to obtain the synthesized image corresponding to each predefined synthesis number. As a plurality of predefined synthesis numbers are stored, a plurality of synthesized images corresponding to the plurality of predefined synthesis numbers are obtained. After the plurality of synthesized images corresponding to the plurality of predefined synthesis numbers are obtained, image quality (such as image definition) of each of the plurality of synthesized images may be calculated. A synthesized image having the optimal image quality (referred as a target synthesized image) among the plurality of synthesized images may be determined, and the predefined synthesis number corresponding to the target synthesized image may be determined and referred as a target predefined synthesis number. After the target predefined synthesis number is determined, the target predefined synthesis number may further be determined as the target image shooting parameter value. The target preview image, the target exposure parameter value, and the target image shooting parameter value may be determined and subsequently stored into the training set correspondingly. The target preview image, the target exposure parameter value, and the target image shooting parameter value corresponding to another time point may be obtained by the terminal device by following the above-mentioned process similarly, in such a way, each correspondence relationship in the training set may be obtained.

Alternatively, the image shooting parameter may further include the performance parameter of the terminal device. The number of images for image synthesis corresponding to the preview image and the exposure parameter, and the performance parameter of the terminal device corresponding to the preview image and the exposure parameter may be determined during determining the training set. The terminal device may perform operations of: performing image synthesis to the set of the target preview image based on a plurality of performance parameter values of the terminal device to obtain a synthesized image corresponding to the predefined synthesis number and each of the plurality of performance parameter values of the terminal device. As a plurality of predefined synthesis numbers are stored, a plurality of synthesized images corresponding to the plurality of predefined synthesis numbers and the plurality of performance parameter values of the terminal device may be obtained. Accordingly, the terminal device may further perform operations of: determining the target synthesized image having the optimal image quality among the plurality of synthesized images corresponding to the plurality of predefined synthesis numbers and the plurality of performance parameter values of the terminal device; and determining the target predefined synthesis number and a target performance parameter value of the terminal device corresponding to the target synthesized image to be the target image shooting parameter value.

Figure 3:
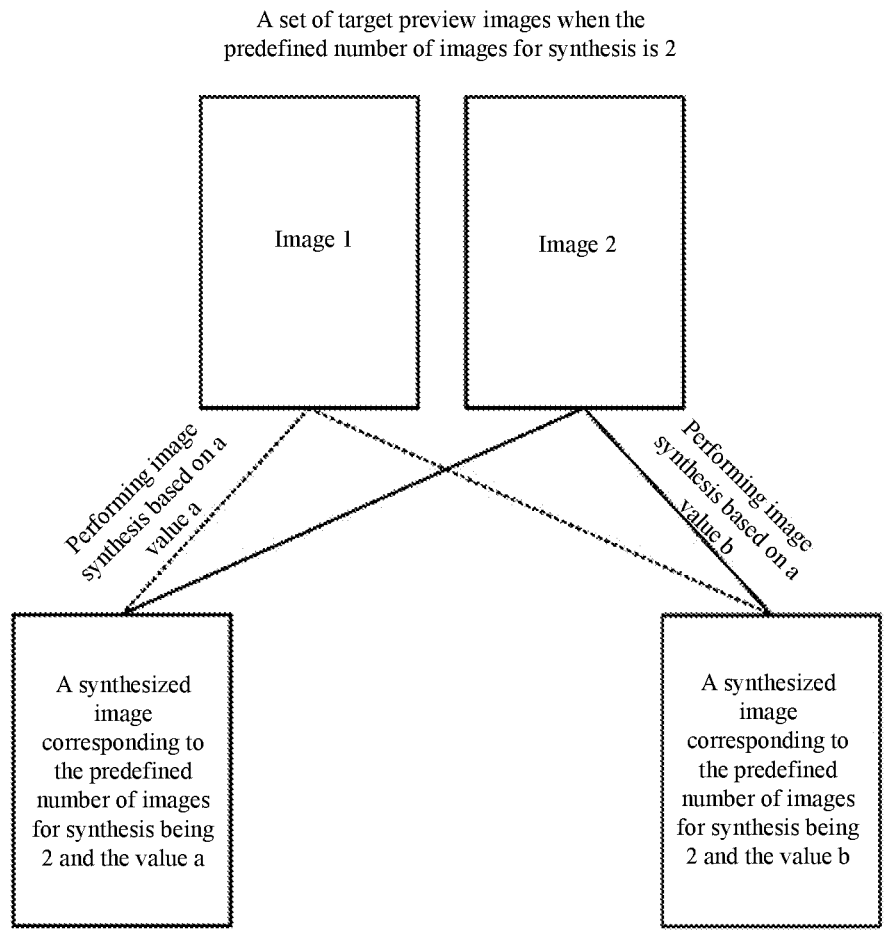
FIG. 3 is a diagram of a predefined number of images for synthesis corresponding to a plurality of predefined performance parameter values of a terminal device according to an embodiment of the present disclosure.

During implementation, the terminal device may store a plurality of performance parameter values. In a situation of the image shooting parameter including the performance parameter of the terminal device, a plurality of sets of target preview images corresponding to the plurality of predefined synthesis numbers may be determined, and the terminal device may subsequently perform image synthesis to the plurality of sets of target preview images based on the plurality of performance parameter values of the terminal device respectively to obtain a plurality of synthesized images corresponding to the predefined synthesis number and the plurality of predefined performance parameter values of the terminal device. That is, each predefined synthesis number and each performance parameter may correspond to one of the plurality of synthesized images, and that is, the number of obtained synthesized images corresponding to the plurality of predefined synthesis numbers and the plurality of predefined performance parameter values of the terminal device may equal to the number of the predefined synthesis numbers multiplied by the number of the plurality of performance parameter values of the terminal device. For example, as shown in FIG. 3, the predefined synthesis number is 2, i.e., the number of the predefined synthesis numbers is 1, and the plurality of performance parameter values of the terminal device may include a value of a and a value of b, i.e., the number of the plurality of performance parameter values is 2. In the set of target preview images corresponding to the predefined synthesis number being equal to 2, the terminal device may perform image synthesis to the set of target preview images, in response to the performance parameter value of the terminal device being a (i.e., the terminal device may set the performance parameter of the terminal device to be a), to obtain a synthesized image corresponding to the predefined synthesis number being 2 and the performance parameter value of the terminal device being a. The terminal device may perform image synthesis to the set of target preview images, in response to the performance parameter of the terminal device being b, to obtain a synthesized image corresponding to the predefined synthesis number being 2 and the performance parameter of the terminal device being b. Therefore, 2 (i.e., equal to 1 multiplied by 2) synthesized images are obtained.

After the plurality of synthesized images corresponding to the plurality of predefined synthesis numbers and the plurality of predefined performance parameters of the terminal device are obtained, image quality of each of the plurality of synthesized images may be calculated. Among the plurality of synthesized images, the target synthesized image having the optimal image quality may be determined. Further, the target predefined synthesis number and the target predefined performance parameter value of the terminal device corresponding to the target synthesized image may be determined to be the target image shooting parameter value. Three parameter values (i.e., the target preview image, the target exposure parameter value, and the target image shooting parameter value) may be stored into the training set correspondingly.

Alternatively, the terminal device may record power consumption for performing image synthesis to each set of target preview images. Accordingly, the terminal device may perform following operations to determine the target image shooting parameter value. The terminal device may record the power consumption for obtaining each synthesized image corresponding to each predefined synthesis number. The target synthesized image having comprehensively optimal image quality and power consumption may be determined among the plurality of synthesized images corresponding to the plurality of predefined synthesis numbers, and the target predefined synthesis number corresponding to the target synthesized image may be determined to be the target image shooting parameter value.

During implementation, after the set of target preview images corresponding to each of the plurality of predefined synthesis numbers is obtained, image synthesis may be performed to the set of target preview images, the plurality of synthesized images corresponding to the plurality of predefined synthesis numbers may be obtained, and the power consumption for performing image synthesis may be recorded. That is, the power consumption for obtaining each synthesized image corresponding to each predefined synthesis number may be recorded. The power consumption may include one or more of: a consumed battery level and duration spent for image synthesis. In such a situation, after the plurality of synthesized images corresponding to the plurality of predefined synthesis numbers and the power consumption corresponding to the plurality of predefined synthesis numbers are obtained, the terminal device may determine the target synthesized image having comprehensively optimal image quality and power consumption among the plurality of synthesized images (a synthesized image having a greatest quotient of the image quality to the power consumption may be determined to be the target synthesized image). The target predefined synthesis number corresponding to the target synthesized image may be determined to be the target image shooting parameter value.

An apparatus embodiment of the present disclosure will be described hereafter, and may be arranged to perform the method embodiments of the present disclosure. Details that are not illustrated in the apparatus embodiment may be referred to the method embodiments of the present disclosure.

Figure 4:
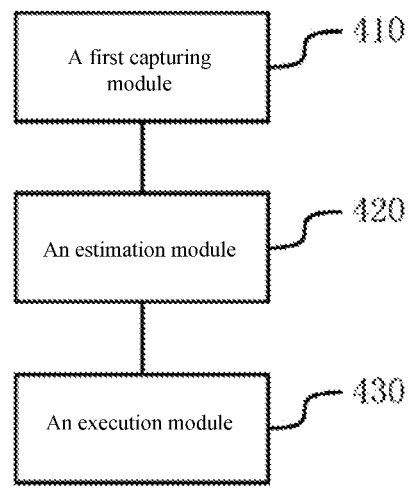
FIG. 4 is a structural view of an apparatus for image shooting according to an embodiment of the present disclosure.

As shown in FIG. 4, a diagram of an image shooting apparatus according to an embodiment of the present disclosure is provided. The apparatus may have a function of performing the method as described in the above embodiments, and the function may be realized by hardware or by hardware executing corresponding software. The apparatus may include following modules. A first acquisition module 410 of the present disclosure may be arranged to allow an image shooting component to shoot a preview image and may be arranged to acquire an exposure parameter value corresponding to the preview image, when the terminal device is in a pending state for image shooting.

An estimation module 420 may be arranged to obtain an image shooting parameter value of a present night scene via an estimation model based on the preview image and the exposure parameter corresponding to the preview image. The estimation model may be trained by taking an image data parameter, the exposure parameter, and the image shooting parameter as variables. The image shooting parameter may include the image-synthesizing number, which indicates the number of preview images required to obtain a target synthesized image.

An execution module 430 may be arranged to perform an image-shooting process, in response to receiving an image shooting instruction, based on the image shooting parameter, to obtain the target synthesized image.

Alternatively, the image shooting parameter may include a performance parameter of the terminal device.

Figure 5:
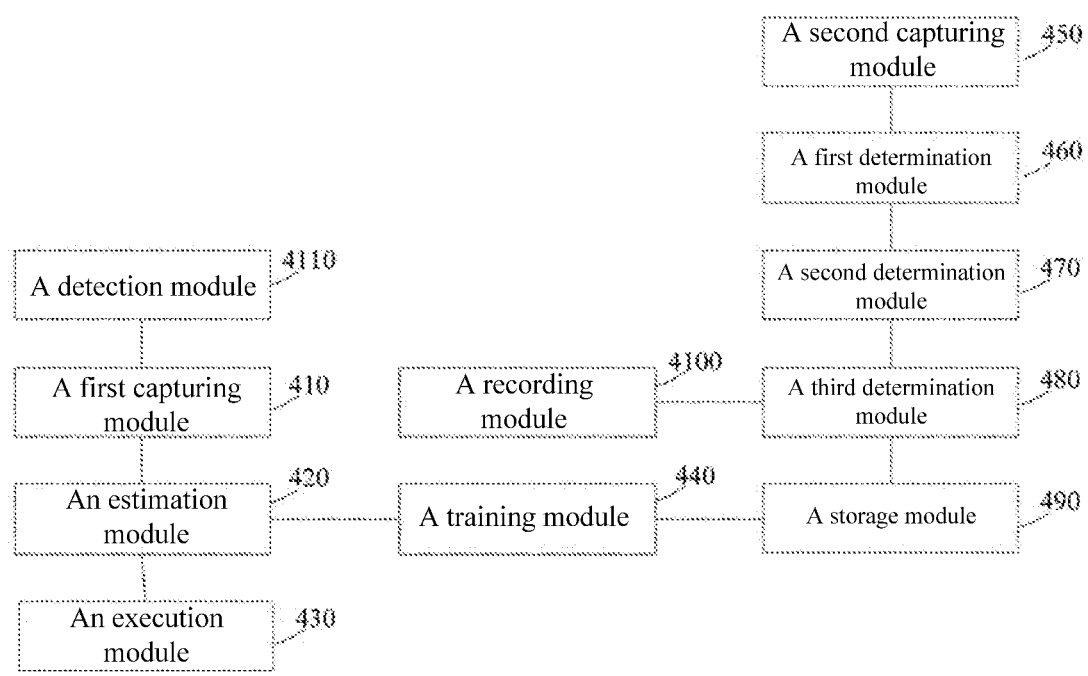
FIG. 5 is a structural view of an apparatus for image shooting according to an embodiment of the present disclosure.

Alternatively, as shown in FIG. 5, the apparatus may further include following modules.

A training module 440 may be arranged to train the estimation model based on a correspondence relationship and by following a training principle. The correspondence relationship may be correspondence among the preview image, the exposure parameter value, and the image shooting parameter value. The training principle may be approaching the image shooting parameter value estimated by the estimation model towards a stored image shooting parameter value corresponding to the preview image and the exposure parameter.

Alternatively, as shown in FIG. 5, the apparatus may further include following modules.

A second acquisition module 450 may be arranged to allow the image shooting component to shoot a predefined number of preview images.

A first determination module 460 may be arranged to determine a target preview image from the acquired predefined number of preview images, and may be arranged to acquire a target exposure parameter corresponding to the target preview image.

A second determination module 470 may be arranged to select a predefined synthesis number of preview images including the target preview image from the predefined number of preview images to obtain a set of target preview images corresponding to the predefined synthesis number, and may be arranged to perform an image-synthesis process to the set of target preview images to obtain a synthesized image corresponding to the predefined synthesis number. A plurality of predefined synthesis numbers may be stored in the terminal device, a plurality of sets of target preview images may be obtained correspondingly, and a plurality of synthesized images may be obtained correspondingly.

A third determination module 480 may be arranged to determine a synthesized image having optimal image quality from the plurality of synthesized images corresponding to the plurality of predefined synthesis numbers to be a target synthesized image, and may be arranged to determine a target predefined synthesis number corresponding to the target synthesized image to be the target image shooting parameter.

A storage module 490 may be arranged to store the target preview image, the target exposure parameter value, and the target image shooting parameter value into the training set correspondingly.

Alternatively, the second determination module 470 may be arranged to perform following operations.

Image synthesis may be performed to the set of target preview images based on a plurality of predefined performance parameter of the terminal device respectively, and the synthesized images corresponding to the predefined synthesis number and each of the plurality of performance parameters of the terminal device may be obtained.

The third determination module 480 may further be arranged to perform following operations.

The target synthesized image having optimal image quality may be determined from the plurality of synthesized images corresponding to the plurality of predefined synthesis numbers and the plurality of predefined performance parameter values of the terminal device. The target predefined synthesis number and the target performance parameter value of the terminal device corresponding to the target synthesized image may be determined to be the target image-shooting parameter value.

Alternatively, as shown in FIG. 5, the apparatus may further include following modules.

A recording module 4100 may be arranged to record power consumption for obtaining each of the plurality of synthesized images corresponding to each of the plurality of predefined synthesis numbers.

The third determination module 480 may be arranged to perform following operations.

A synthesized image having comprehensively optimal image quality and power consumption may be determined from the plurality of synthesized images to be the target synthesized image, and the target predefined synthesis number corresponding to the target synthesized image may be determined to be the target image shooting parameter.

Alternatively, the image shooting parameter may include the target predefined synthesis number, and the execution module 430 may be arranged to perform following operations.

The set of target preview images may be obtained based on the target predefined synthesis number, and image synthesis may be performed to the set of target preview images to obtain the target synthesized image.

Alternatively, the image shooting parameter may include the target predefined performance parameter of the terminal device, and the execution module 430 may be arranged to perform following operations.

Image synthesis may be performed to the set of target preview images, based on the target predefined performance parameter of the terminal device, to obtain the target synthesized image.

Alternatively, as shown in FIG. 5, the apparatus may further include following modules.

A detection module 4110 may be arranged to detect whether a present time stamp is within a predefined time range.

The first acquisition module 410 may be arranged to perform the preview image shooting process via the image shooting component, in response to the present time stamp being within the predefined time range, and may be arranged to acquire the exposure parameter corresponding to the preview image.

In the embodiment of the present disclosure, when the terminal device is in the pending state for image shooting, the preview image may be acquired via the image shooting component, and the exposure parameter value corresponding to the preview image may be acquired. The image shooting parameter value of the present night scene may be estimated based on the preview image and the estimation model. The estimation model may be trained in advance by taking the image data parameter, the exposure parameter, and the image shooting parameter as variables. The image shooting parameter may include the number of images for synthesis. In response to receiving an image shooting instruction, an image-shooting process may be performed based on the estimated image shooting parameter value. In such a way, when the user tends to shoot an image in a night scene, the terminal device may automatically calculate the number of images for synthesis for the present night scene. Further, the acquired image may be processed based on the number of images for synthesis, and the user may not need to manually activate the function of image synthesis for night scenes, the efficiency of image shooting may be improved.

To be noted that, when the image shooting apparatus provided by the above-mentioned embodiment is shooting images, the apparatus provided in examples may be illustrated according to each functional module. In an application, functions of the apparatus may be achieved by being assigned to various functional modules, that is, an internal structure of the terminal device may be divided into various functional modules to achieve all of or a part of the above-mentioned functions. In addition, the apparatus for image shooting provided in the above-mentioned embodiments and the method for image shooting provided in the embodiments share a same invention concept. A process of achieving the functions may refer to the method embodiments, and will not be repeatedly described herein.

Figure 6:
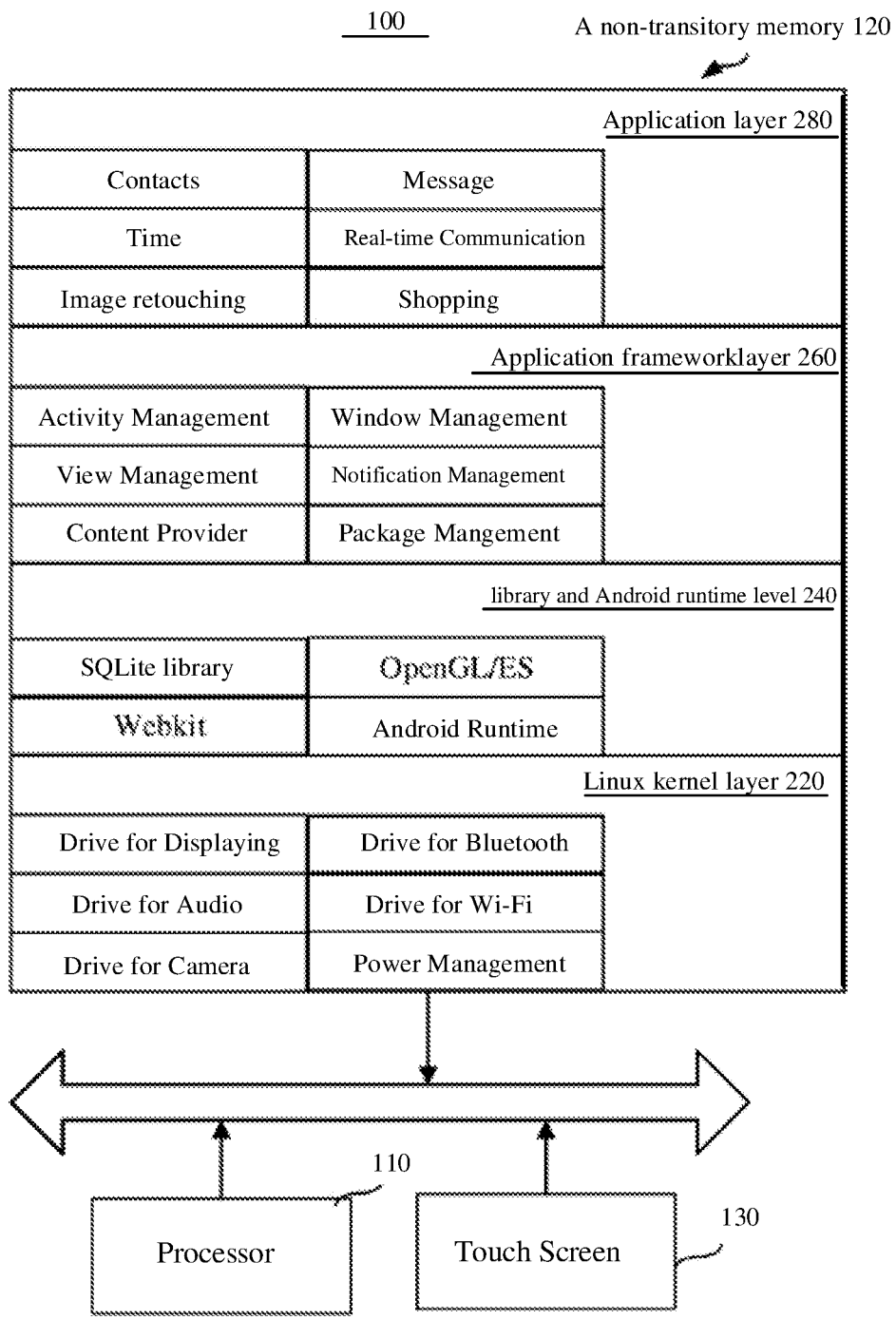
FIG. 6 is a structural view of a terminal device according to an embodiment of the present disclosure.
Figure 7:
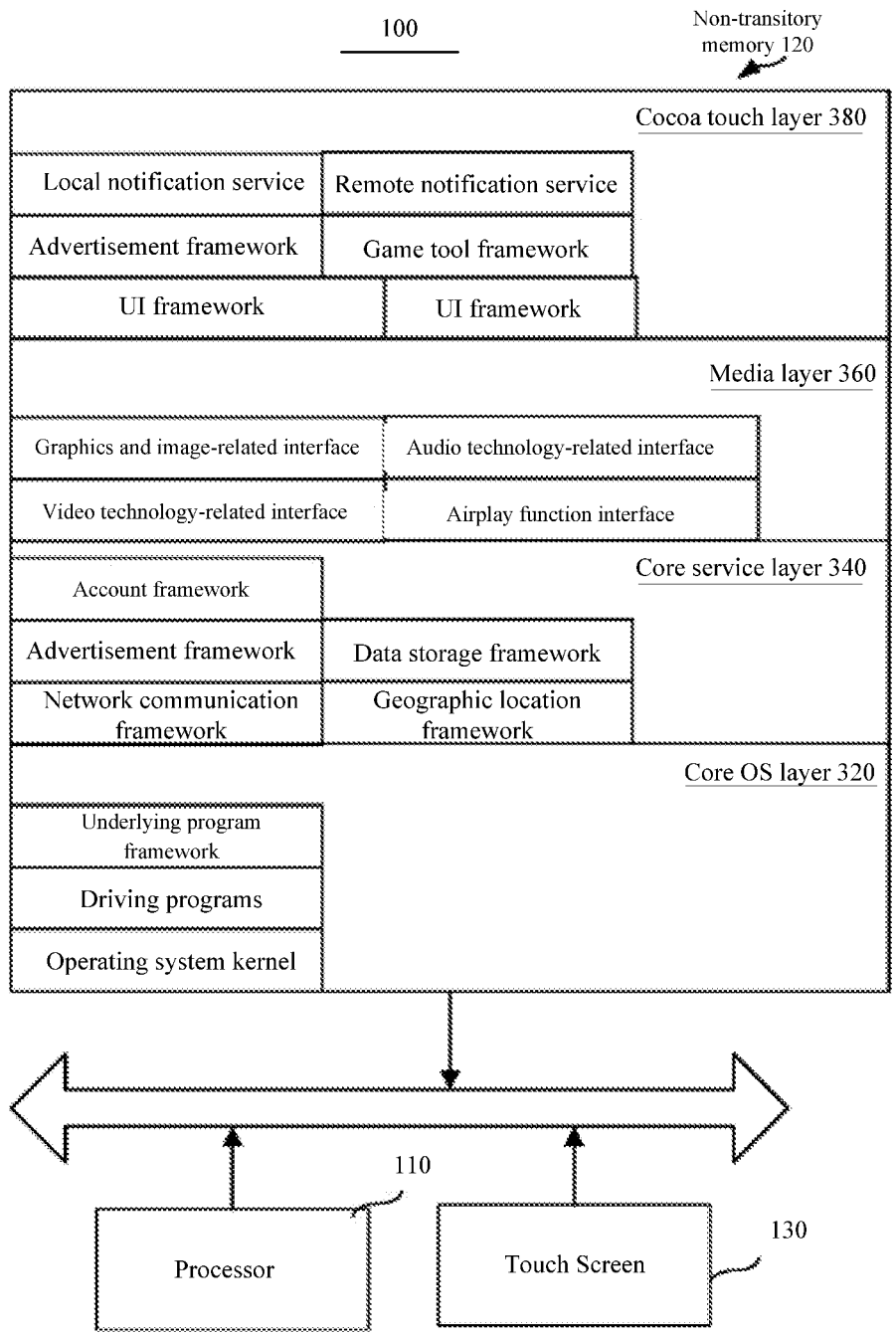
FIG. 7 is a structural view of a terminal device according to an embodiment of the present disclosure.

As shown in FIG. 6 and FIG. 7, a structural diagram of the terminal device 100 according to an embodiment of the present disclosure is provided. The terminal device 100 may be a mobile phone, a tablet computer, a laptop, an electronic book, and the like. The terminal device 100 of the present disclosure may include one or more of: a processor 110, a non-transitory memory 120, and a touch screen 130.

The processor 110 may include one or more processing cores. The processor 110 may be arranged to connect each internal component of the terminal device 100 via various interfaces and lines, and may be arranged to execute various functions of the terminal device 100 and process data by running or executing an instruction, a program, a code set, or an instruction set stored in the non-transitory memory 120 and by invoking data stored in the non-transitory memory 120. Alternatively, the processor 110 may be realized by at least one of: a hardware form of digital signal processing (DSP), a hardware form of field-programmable gate array (FPGA), and a hardware form of programmable logic array (PLA). The processor 110 may integrate at least one of: a central processing unit (CPU), a graphics processing unit (GPU), and a modem. The CPU may substantially be arranged to process an operating system, a user interface, an application, and the like. The GPU may be arranged to render and draw content to be displayed by the touch screen 130. The modem may be arranged to process wireless communication. It may be understood that, the modem may not be integrated into the processor 110, but may be presented as a chip instead.

The non-transitory memory 120 may include a random access memory (RAM) or a read-only memory (ROM). Alternatively, the non-transitory memory 120 may include a non-transitory computer-readable storage medium. The non-transitory memory 120 may be arranged to store the instruction, the program, the code, the code set, or the instruction set. The non-transitory memory 120 may include a program storage area and a data storage area. An instruction for achieving the operation system, an instruction for achieving at least one function (such as touching, audio playing, image playing, and the like), and an instruction for performing the method in each embodiment may be stored in the program storage area. Data generated based on usage of the terminal device 100 (such as audio data and contact information) may be stored in the data storage area.

Taking the Android operating system as an example, the program and the data stored in the non-transitory memory 120 may be shown in FIG. 6. The non-transitory memory 120 may be arranged to store a Linux® kernel layer 220, a library and Android runtime level 240, an application framework layer 260, and an application layer 280. The Linux kernel layer 220 may provide underlying drives for various hardware of the terminal device 100, such as a drive for displaying, a drive for an audio, a drive for a camera, a drive for Bluetooth®, a drive for Wireless-Fidelity (Wi-Fi), power management, and the like. The library and Android® runtime level 240 may provide a feature support for the Android system via some C/C++ libraries. For example, a SQLite library may provide a support for database, an OpenGL/ES library may provide a support for three-dimensional drawing, and a Webkit library may provide a support for a browser kernel. The library and Android runtime level 240 may further include an Android Runtime, and the Android Runtime may provide some core libraries allowing a developer to program Android applications through Java. The application framework layer 260 may provide various application programming interfaces (API) for generating applications, and the developer may generate their own applications, such as activity management, window management, view management, notice management, a content provider, package management, call management, resource management, and positioning management, through the various APIs. At least one program may run in the application layer 280, and the at least one program may be originally installed with the system, such as a contact program, a message program, a time program, a camera application, and the like; alternatively, the at least one program may be developed by a third developer, such as a real-time communication program, an image retouching program, and the like.

Figure 9:
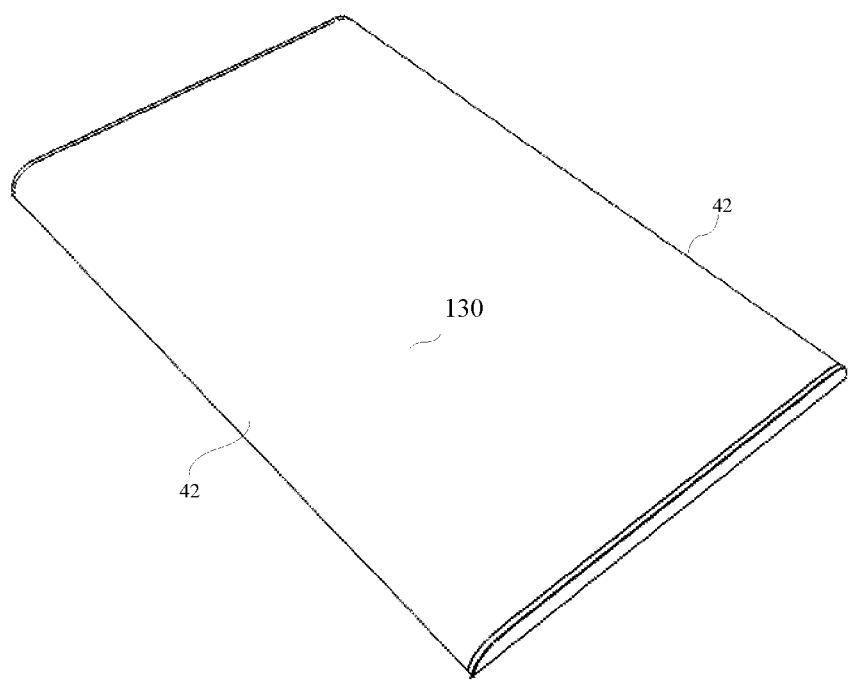
FIG. 9 is a structural view of a terminal device according to an embodiment of the present disclosure.

Taking an iPhone operating system (iOS) as an example, the program and the data stored in the non-transitory memory 120 may be shown in FIG. 9. The iOS may include: a core OS layer 320, a core service layer 340, a media layer 360, and a cocoa touch layer 380. The core OS layer 320 may include an OS kernel, a driving program, and an underlying program framework. Functions provided by the underlying program framework may be similar to functions of hardware, and an application framework in the core service layer 340 may use the underlying program framework. The core service layer 340 may provide systemic services and/or the program framework, such as a foundation framework, an account framework, an advertisement framework, a data storage framework, a network connection framework, a geographic location framework, a moving framework, and the like, for an application. The media layer 360 may provide an audio-visual related interface for the application, such as a graphics-related and image-related interface, an audio technology-related interface, a video technology-related interface, an airplay interface of audio-video transmission, and the like. The cocoa touch layer 380 may provide various frameworks related to various common interfaces for program development, such as a local notification service, a remote notification service, an advertisement framework, a game tool framework, a user interface (UI) framework, a UI kit framework, a map framework, and the like, and may manage interactive touching operations performed by a user on the terminal device 100.

As shown in FIG. 7, the frameworks related to most of the applications may include, but may not be limited to, the foundation framework in the core service layer 340 and the UI kit framework in the cocoa touch layer 380. The foundation framework may provide various foundational object types and data types, and may provide foundational systemic service for all applications, but may not be related to the UI. The UI kit framework may provide a foundational UI class library for generating a touchable UI. Applications of iOS may provide the UI based on the UI kit framework. Therefore, the UI kit framework may provide foundational frameworks for the applications to generate the UI, to draw, to process interactive events with the user, to respond to postures, and the like.

The touch screen 130 may be arranged to receive a touch operation performed on or near the touch screen 130 by a finger, a touch pencil, or any appropriate object, and may be arranged to display the user interface for each application. The touch screen 130 may commonly be arranged on a front plate of the terminal device 100. The touch screen 130 may be provided as a full screen, a curved screen, or an anomalous screen. The touch screen 130 may also be provided as a curved full screen, or a curved anomalous screen, and will not be limited by the present disclosure.

A full screen may be provided.

Figure 8:
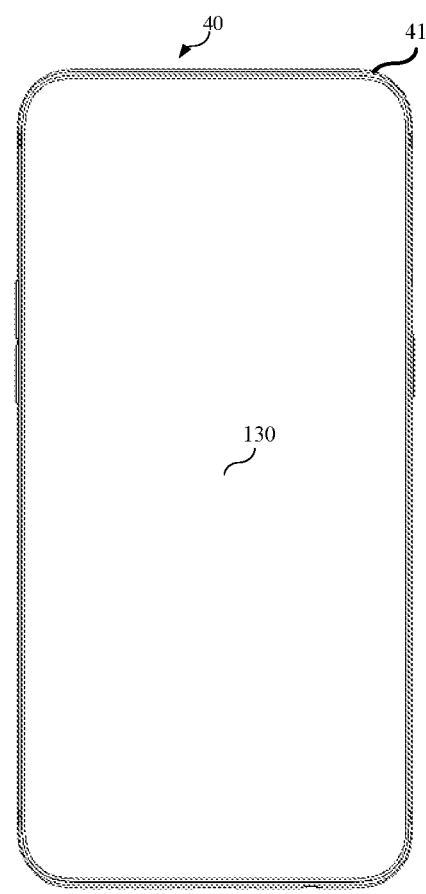
FIG. 8 is a structural view of a terminal device according to an embodiment of the present disclosure.

For the full screen, an area occupied by the touch screen 130 may be greater than a threshold value (such as 80%, or 90%, or 95%). The area occupied by the touch screen 130 may be calculated as: (an area of the touch screen 130/an area of the front plate of the terminal device 100)*100%. The area occupied by the touch screen 130 may also be calculated as: (an area of a display region defined by the touch screen 130/the area of the front plate of the terminal device 100)*100%. The area occupied by the touch screen 130 may also be calculated as: (a diagonal of the touch screen 130/a diagonal of the front plate of the terminal device 100)*100%. According to an example provided in FIG. 8, almost the entire front plate of the terminal device 100 is covered by the touch screen 130. An entirety of the front plate 40 of the terminal device 100, excluding an edge defined by a middle frame, may be covered by the touch screen 130. Four angles of the touch screen 130 may be right angles or rounded-angles.

For the full screen, at least one of front-plate components may be integrated within or under the touch screen 130. Alternatively, the at least one of front-plate components may include: a camera, a fingerprint sensor, a proximity light sensor, a distance sensor, and the like. In some embodiments, other components arranged on the front plate of a conventional terminal device may be integrated into an entire region or a part of the entire region of the touch screen 130. For example, the photosensitive element of the camera may be divided into various photosensitive pixels, and each of the various photosensitive pixels may be integrated into a black region of each display pixel of the touch screen 130. As the at least one of front-plate components is integrated within the touch screen 130, the area occupied by the full screen may be improved.

In other embodiments, the at least one front-plate component arranged with the conventional terminal device may be arranged on a side of a back of the terminal device 100. For example, an ultrasound fingerprint sensor may be arranged below the touch screen 130, a bone conduction earpiece may be arranged inside the terminal device 100, and the camera may be arranged on the side of the terminal device 100 or may be arranged as pluggable.

In some available embodiments, when the terminal device 100 is arranged with the full screen, one side, two sides (such as a left side and a right side), or four sides (such as a top side, a bottom side, a left side, and a right side) of the middle frame of the terminal device 100 may be arranged with an edged touch sensor (i.e., a touch sensor arranged on an edge of the terminal device 100). The edged touch sensor may be arranged to detect at least one of the touch operation, a click operation, a press operation, and a sliding operation performed by the user. The edged touch sensor may be any one of a touch sensor, a thermal sensor, and a pressure sensor. The user may perform operations on the edged touch sensor to manipulate the applications and processes of the terminal device 100.

A curved screen may be arranged.

For a curved screen, a screen region of the touch screen 130 may not be in a planar. Typically, the curved screen may at least have a cross section. The cross section may be curved, a projection of the curved screen along a direction perpendicular the cross section may be a flat plane, and the curved cross section may be U-shaped. Alternatively, at least one side edge of the curved screen may be curved. Alternatively, at least one side edge of the curved touch screen 130 may extend to cover the middle frame of the terminal device 100. In such a way, the middle frame, which may initially be unable to display and unable to be responsive to the touch operation, may be covered by the curved touch screen 130 to form a display region and/or a region able to receive operations, such that the area occupied by the curved screen may be improved. Alternatively, as shown in FIG. 9, the left side and the right side 42 of the touch screen may be curved. Alternatively, the top side and the bottom side of the touch screen may be curved. Alternatively, the top side, the bottom side, the left side, and the right side of the touch screen may be curved. In an available embodiment, the touch screen may be made of flexible material.

An anomalous screen may be arranged.

For an anomalous screen, a shape of the touch screen may be irregular, and an irregular shape may not include a rectangle or a rounded rectangle. Alternatively, the anomalous screen may refer to a rectangular or a rounded rectangular touch screen 130 having a protrusion, a notch, and/or defining a hole. Alternatively, the protrusion, the notch, and/or the hole may be arranged or defined on the edge and/or in a center of the touch screen 130. The protrusion, the notch, and/or the hole may be arranged or defined at middle or two ends of the edge. The protrusion, the notch, and/or the hole may be arranged or defined in at least one of a top region, a left top region, a left region, a left bottom region, a bottom region, a right bottom region, a right region, and a right top region. When the protrusion, the notch, and/or the hole is arranged or defined in various regions, the protrusion, the notch, and/or the hole may be clustered or spaced apart from each other, distributed symmetrically or asymmetrically. Alternatively, the number of the protrusion, the number of the notch, and the number of the hole may not be limited by the present disclosure.

As the anomalous screen may cover an upper region and a bottom region of the touch screen, allowing the upper and bottom regions to display and/or to receive operations, the area occupied of the front plate of the terminal device by the touch screen may be increased, and an occupation ratio of the anomalous region may be greater. In some embodiments, the notch and/or the hole may be defined to receive the at least one front-plate component, and the at least one front-plate component may include at least one of the camera, the fingerprint sensor, the proximity light sensor, the distance sensor, the ear piece, an ambient light sensor, and a physical button.

Figure 10:
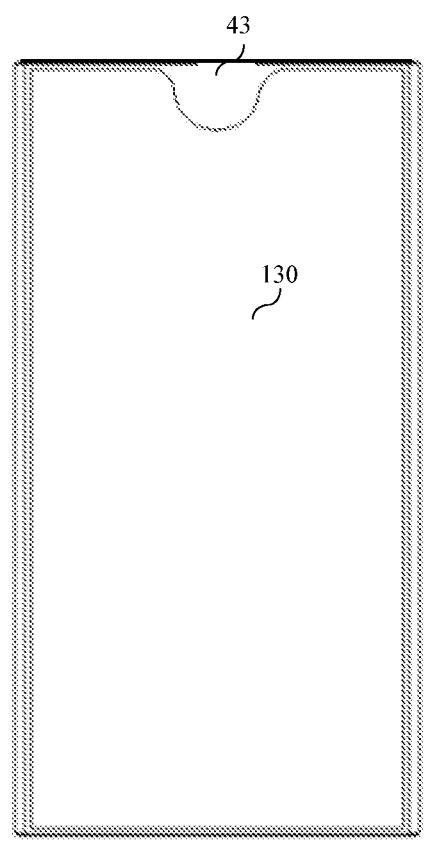
FIG. 10 is a structural view of a terminal device according to an embodiment of the present disclosure.
Figure 11:
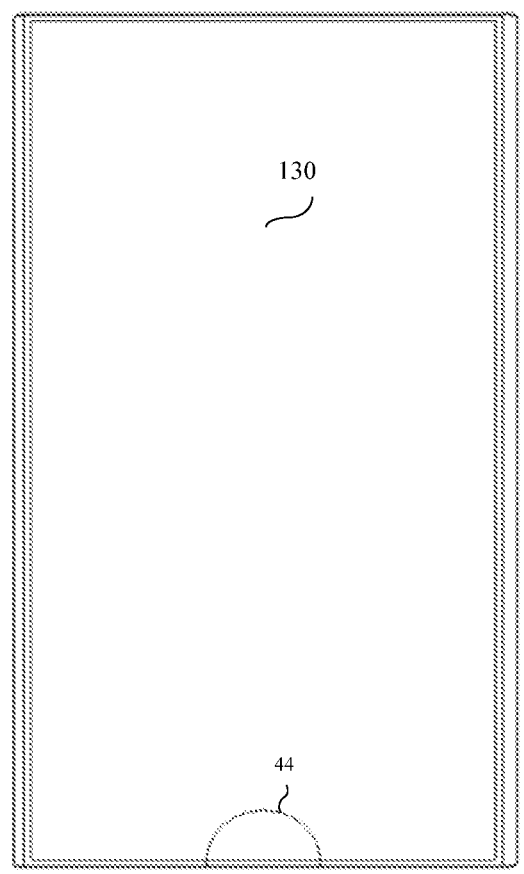
FIG. 11 is a structural view of a terminal device according to an embodiment of the present disclosure.
Figure 12:
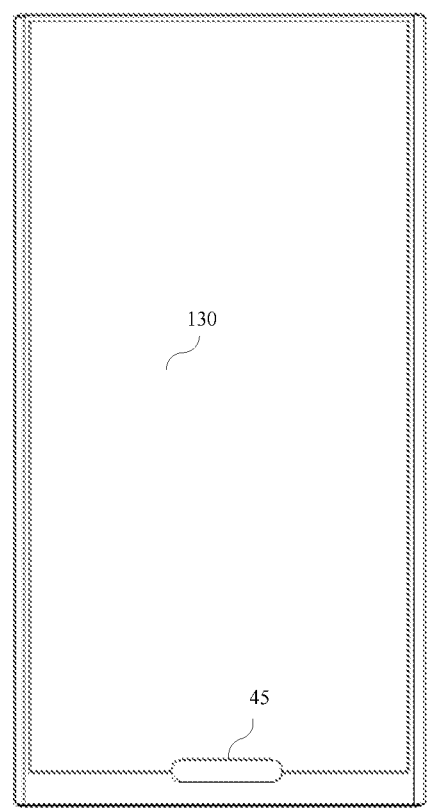
FIG. 12 is a structural view of a terminal device according to an embodiment of the present disclosure.
Figure 13:
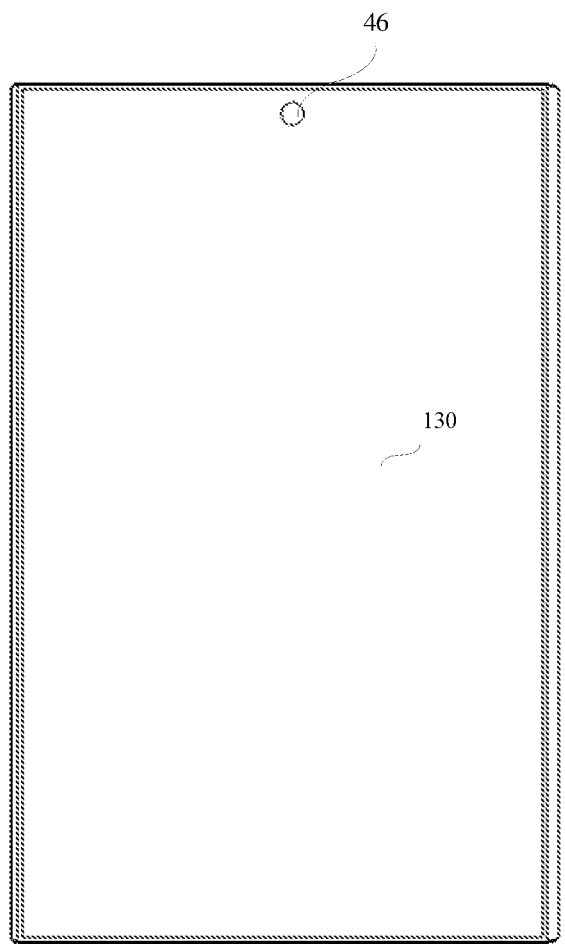
FIG. 13 is a structural view of a terminal device according to an embodiment of the present disclosure.

For examples, the notch may be defined on one or more edges. The notch may be a semicircular notch, a rectangular notch with a right angle, a rounded rectangular notch, or an irregular notch. According to examples shown in FIG. 10, the anomalous screen may refer to a touch screen 130 defining the semicircular notch 43 at a middle of the top side, and the notch 43 may be defined to receive the at least one front-plate component, including the camera, the distance sensor (also referred as a proximity sensor), the ear piece, the ambient light sensor. As shown in FIG. 11, the anomalous screen may refer to a touch screen 130 defining the semicircular notch 44 at a middle of the bottom side, and the semicircular notch 44 may be defined to receive at least one of the physical button, the fingerprint sensor, and a microphone. As shown in FIG. 12, the anomalous screen may refer to a touch screen 130 defining a half-elliptical notch 45 at a middle of the bottom side and defining another half-elliptical notch on the front plate of the terminal device 100. A side wall of the half-elliptical notch 45 and a side wall of the another half-elliptical notch may be combined to form an elliptical region to receive the physical button or the fingerprint sensor. As shown in FIG. 13, the anomalous screen may refer to a touch screen 130 defining a hole 45 at a top, and the hole 45 may be defined to receive the at least one front-plate components, including the camera, the distance sensor, the earpiece, the ambient light sensor.

Further, it may be understood to any one of skill in the art that, a structure of the terminal device 100 as shown in the above-mentioned figures may not limit the terminal device 100. The terminal device may be arranged with more or fewer components compared to the components shown in the figures, or arranged with combination of some components, or the components may be distributed in a different manner. For example, the terminal device 100 may further include a radio frequency circuit, an input unit, a sensor, an audio circuit, a Wi-Fi module, a power, a Bluetooth module, and the like, which may not be illustrated in details herein.

In the embodiments of the present disclosure, when the terminal device is in the pending state for image shooting, the image shooting component may acquire the preview image and the exposure parameter corresponding to the preview image. Based on the preview image and the estimation model, the image shooting parameter of the present night scene may be estimated, wherein the estimation model may be trained in advance by taking the image data parameter, the exposure parameter, and the image shooting parameter as variables, and the image shooting parameter ma include number of images for synthesis. In response to receiving the image shooting instruction, an image-shooting process may be performed based on the estimated image shooting parameter. In such away, when the user is intending to shoot an image at a night scene, the terminal device may automatically calculate the number of images for synthesis for the present night scene, and therefore, the image-shooting process may be performed based on the number of images for synthesis, and the user may not be required to manually activate the function for image shooting at night scenes, improving the efficiency of image shooting.

Any one of skill in the art may understand that all of or a part of operations of the above-mentioned may be achieved through hardware or achieved by programs instructing related hardware. The program may be stored in a non-transitory computer-readable storage medium, and the storage medium may be a ROM, a disc or an optical disc.

The above-mentioned embodiments are preferred embodiments of the present disclosure, and shall not limit the present disclosure. Any modification, any equivalent replacement, any improvement within the spirit and the principle of the present disclosure shall be within the scope of the present disclosure.

What is claimed is:

1. A method of image shooting, performed by a terminal device, comprising:

shooting preview images via an image shooting component and acquiring values of an exposure parameter corresponding to the preview images, when the terminal device is in a pending state for image shooting;

estimating a value of an image-shooting parameter of a present night scene via an estimation model according to the preview images and the values of the exposure parameter corresponding to the preview images, wherein the estimation model is trained by taking an image data parameter, the exposure parameter, and the image shooting parameter as variables; and the image shooting parameter comprises an image-synthesizing number, which is a number of preview images required to obtain a target synthesized-image; and performing an image-shooting process according to the estimated value of the image-shooting parameter, in response to an image-shooting instruction, to obtain the target synthesized-image; and before estimating the value of the image-shooting parameter of the present night scene via the estimation model according to the preview images and the values of the exposure parameter corresponding to the preview images, training the estimation model based on a pre-stored correspondence relationship among training preview images, values of a training exposure parameter, and values of a training image-shooting parameter in a training set, and by following a pre-stored training principle of values of the image-shooting parameter estimated by the estimation model, being approached towards values of the training image-shooting parameter corresponding to the training preview images and the values of the training exposure parameter, to achieve the estimation model.

2. The method according to claim 1, wherein the image-shooting parameter further comprises a performance parameter of the terminal device.

3. The method according to claim 1, further comprising:

shooting a predefined number of preview images via the image shooting component;

determining a target preview image among the predefined number of preview images and acquiring a target value of the exposure parameter corresponding to the target preview image;

selecting a predefined synthesis number of preview images comprising the target preview image from the predefined number of preview images to obtain a set of target preview images corresponding to the predefined synthesis number, wherein a plurality of predefined synthesis numbers are pre-stored in the terminal device, and a plurality of sets of target preview images corresponding to the plurality of predefined synthesis numbers are obtained according to each of the plurality of predefined synthesis numbers;

performing an image-synthesis process for each of the plurality of sets of target preview images to obtain a synthesized image corresponding to the predefined synthesis number, such that a plurality of synthesized images corresponding to the plurality of predefined synthesis numbers are obtained;

determining a synthesized image having optimal image quality from the plurality of synthesized images corresponding to the plurality of predefined synthesis numbers to be the target synthesized-image, and determining a target predefined synthesis number corresponding to the target synthesized-image to be a target value of the image-shooting parameter; and storing the target preview image, the target value of the exposure parameter, and the target value of the image-shooting parameter into the training set correspondingly.

4. The method according to claim 3, wherein the performing the image-synthesis process for each of the plurality of sets of target preview images to obtain the synthesized image corresponding to the predefined synthesis number comprises:

performing the image-synthesis process to the set of target preview images based on each of a plurality of values of a performance parameter of the terminal device to obtain a plurality of synthesized images corresponding to the predefined synthesis number and each of the plurality of values of the performance parameter of the terminal device; and the determining the synthesized image having optimal image quality from the plurality of synthesized images corresponding to the plurality of predefined synthesis numbers to be the target synthesized-image, and determining the target predefined synthesis number corresponding to the target synthesized-image to be the target value of the image-shooting parameter, comprises:

determining the target synthesized image having the optimal image quality from the obtained plurality of synthesized images, wherein each of the plurality of synthesized images corresponds to each of the plurality of predefined synthesis numbers and each of the plurality of values of the performance parameter, and determining the target predefined synthesis number and a target predefined value of the performance parameter of the terminal device corresponding to the target synthesized image to be the target value of the image-shooting parameter.

5. The method according to claim 3, further comprising:

recording power consumption for obtaining the synthesized image corresponding to the predefined synthesis number; and wherein the determining the synthesized image having optimal image quality from the plurality of synthesized images corresponding to the plurality of predefined synthesis numbers to be the target synthesized-image, and determining the target predefined synthesis number corresponding to the target synthesized-image to be the target value of the image-shooting parameter, comprises:

determining a synthesized image having comprehensively optimal image quality and power consumption among the plurality of synthesized images corresponding to the plurality of predefined synthesis numbers to be the target synthesized-image, and determining the target predefined synthesis number to be the target value of the image-shooting parameter.

6. The method according to claim 3, wherein the performing the image-shooting process according to the estimated value of the image-shooting parameter, in response to the image-shooting instruction, to obtain the target synthesized-image comprises:

acquiring a set of target preview images based on the target predefined synthesis number; and performing the image-synthesis process to the set of target preview images to obtain the target synthesized-image.

7. The method according to claim 6, wherein the value of the image-shooting parameter comprises a target value of the performance parameter of the terminal device, and the performing the image-synthesis process to the set of target preview images to obtain the target synthesized-image comprises:

performing the image-synthesis process to the set of target preview images based on the target value of the performance parameter of the terminal device to obtain the target synthesized-image.

8. The method according to claim 1, further comprising:

before the shooting preview images via an image shooting component and acquiring values of an exposure parameter corresponding to the preview images:

detecting whether a present time stamp is within a predefined time range; and performing, in response to the present time stamp being within the predefined time range, the shooting preview images via an image shooting component and acquiring values of an exposure parameter corresponding to the preview images.

9. A terminal device, comprising a processor and a non-transitory memory, wherein the non-transitory memory is arranged to store at least one instruction, at least one program, a code set, or an instruction set, and the at least one instruction, the at least one program, the code set, or the instruction set are loaded and executed by the processor to perform operations of:

shooting, via an image shooting component, preview images and acquiring values of an exposure parameter corresponding to the preview images, when the terminal device is in a pending state for image shooting;

estimating, via an estimation model, a value of an image-shooting parameter of a present night scene according to the preview images and the values of the exposure parameter corresponding to the preview images, wherein the estimation model is trained by taking an image data parameter, the exposure parameter, and the image shooting parameter as variables; and the image shooting parameter comprises an image-synthesizing number, which is a number of preview images required to obtain a target synthesized-image;

performing an image-shooting process according to the estimated value of the image-shooting parameter, in response to an image-shooting instruction, to obtain the target synthesized-image; and before estimating, via an estimation model, a value of an image-shooting parameter of a present night scene according to the preview images and the values of the exposure parameter corresponding to the preview images, training the estimation model based on a pre-stored correspondence relationship among training preview images, values of a training exposure parameter, and values of a training image-shooting parameter in a training set, and by following a pre-stored training principle of values of the image-shooting parameter estimated by the estimation model, being approached towards values of the training image-shooting parameter corresponding to the training preview images and the values of the training exposure parameter, to achieve the estimation model.

10. The terminal device according to claim 9, wherein the image shooting parameter further comprises a performance parameter of the terminal device.

11. The terminal device according to claim 9, wherein the at least one instruction, the at least one program, the code set, or the instruction set are further loaded and executed by the processor to perform operations of:

shooting, via the image shooting component, a predefined number of preview images;

determining a target preview image from the predefined number of preview images and acquire a target value of the exposure parameter corresponding to the target preview image;

selecting a predefined synthesis number of preview images comprising the target preview image from the predefined number of preview images to obtain a set of target preview images corresponding to the predefined synthesis number; and performing an image-synthesis process to the set of target preview images to obtain a synthesized image corresponding to the predefined synthesis number, wherein a plurality of predefined synthesis numbers are stored in the terminal device, a plurality of sets of target preview images corresponding to the plurality of predefined synthesis numbers are obtained, and a plurality of synthesized images corresponding to the plurality of predefined synthesis numbers are obtained;

determining a synthesized image having optimal image quality from the plurality of synthesized images corresponding to the plurality of predefined synthesis numbers to be the target synthesized-image, and determining a target predefined synthesis number corresponding to the target synthesized-image to be a target value of the image shooting parameter; and storing the target preview image, the target value of the exposure parameter, the target value of the image shooting parameter into the training set correspondingly.

12. The terminal device according to claim 11, wherein the at least one instruction, the at least one program, the code set, or the instruction set are further loaded and executed by the processor to perform operations of:

performing the image-synthesis process to the set of target preview images, based on each of a plurality of predefined values of a performance parameter of the terminal device, to obtain a synthesized image corresponding to the predefined synthesis number and each of the plurality of predefined values of the performance parameter of the terminal device, wherein a plurality of synthesized images are obtained corresponding to the plurality of predefined synthesis numbers and the plurality of predefined values of the performance parameter of the terminal device; and determining the target synthesized-image having the optimal image quality from the obtained plurality of synthesized images corresponding to the plurality of predefined synthesis numbers and the plurality of predefined values of the performance parameter of the terminal device, and determining the target predefined synthesis number and a target predefined value of the performance parameter of the terminal device corresponding to the target synthesized-image to be target values of the image shooting parameter.

13. The terminal device according to claim 11, wherein the at least one instruction, the at least one program, the code set, or the instruction set are further loaded and executed by the processor to perform operations of:

recording power consumption for obtaining each of the plurality of synthesized images corresponding to each of the plurality of predefined synthesis numbers; and determining a synthesized image having comprehensively optimal image quality and the power consumption from the plurality of synthesized images corresponding to the plurality of predefined synthesis numbers to be the target synthesized-image, and determining the target predefined synthesis number corresponding to the target synthesized-image to be the target value of the image shooting parameter.

14. The terminal device according to claim 13, wherein the value of the image shooting parameter comprises the target predefined synthesis number, and the at least one instruction, the at least one program, the code set, or the instruction set are further loaded and executed by the processor to perform operations of:

obtaining the set of preview images based on the target predefined synthesis number, and performing the image-synthesis process to the set of target preview images to obtain the target synthesized-image.

15. The terminal device according to claim 13, wherein the at least one instruction, the at least one program, the code set, or the instruction set are further loaded and executed by the processor to perform operations of:

detecting whether a present time stamp is within a predefined time range; and shooting, via the image shooting component, the preview images and acquiring the values of the exposure parameter corresponding to the preview images, in response to the present time stamp being within the predefined time range.

16. The terminal device according to claim 14, wherein the value of the image shooting parameter comprises a target value of the performance parameter of the terminal device, and the at least one instruction, the at least one program, the code set, or the instruction set are further loaded and executed by the processor to perform operations of:

performing the image-synthesis process to the set of target preview images, based on the target value of the performance parameter of the terminal device, to obtain the target synthesized-image.

17. A non-transitory computer-readable storage medium, comprising at least one instruction, at least one program, a code set, or an instruction set stored in, wherein the at least one instruction, the at least one program, the code set, or the instruction set are capable of being loaded and executed by a processor to perform operations of:

shooting preview images and acquiring values of an exposure parameter corresponding to the preview images;

estimating a value of an image-shooting parameter of a present night scene via an estimation model based on the preview images and the values of the exposure parameter corresponding to the preview images, wherein the estimation model is trained by taking an image data parameter, the exposure parameter, and the image shooting parameter as variables, the image shooting parameter comprises an image-synthesizing number, which is a number of preview images required to obtain a target synthesized-image;

performing an image-shooting process according to the estimated value of the image-shooting parameter, in response to an image-shooting instruction, to obtain the target synthesized-image; and before estimating a value of an image-shooting parameter of a present night scene via an estimation model based on the preview images and the values of the exposure parameter corresponding to the preview images, training the estimation model based on a pre-stored correspondence relationship among training preview images, values of a training exposure parameter, and values of a training image-shooting parameter in a training set, and by following a pre-stored training principle of values of the image-shooting parameter estimated by the estimation model, being approached towards values of the training image-shooting parameter corresponding to the training preview images and the values of the training exposure parameter, to achieve the estimation model.

* * * * *